United States Patent [19]

Gallagher et al.

[11] 3,963,960

[45] June 15, 1976

[54] BIPOLAR CROSSED-FIELD SWITCH TUBE AND CIRCUIT

[75] Inventors: Hayden E. Gallagher; Wolfgang Knauer, both of Malibu, Calif.

[73] Assignee: Hughes Aircraft Company, Culver City, Calif.

[22] Filed: Feb. 28, 1975

[21] Appl. No.: 553,965

Related U.S. Application Data

[63] Continuation-in-part of Ser. No. 507,094, Sept. 18, 1974.

[52] U.S. Cl. .......... 317/11 A; 317/11 E; 313/157; 313/161

[51] Int. Cl.[2] .......... H02H 7/22; H01J 1/50

[58] Field of Search .......... 317/11 E, 11 A, 11 R; 313/161, 157, 162, 158; 307/136

[56] References Cited

UNITED STATES PATENTS

| | | | |
|---|---|---|---|
| 2,530,939 | 11/1950 | Browne, Jr. | 317/11 E |
| 2,673,320 | 3/1954 | Oliwa | 317/11 E X |
| 3,192,440 | 6/1965 | Baltensperger | 317/11 E |
| 3,641,384 | 2/1972 | Lund et al. | 313/157 X |
| 3,714,510 | 1/1973 | Hofmann | 317/11 A |
| 3,777,179 | 12/1973 | Lutz | 317/11 R X |
| 3,781,606 | 12/1973 | Long et al. | 317/11 A |
| 3,786,310 | 1/1974 | Long | 317/11 E X |
| 3,868,550 | 2/1975 | Knauer et al. | 317/11 E X |

*Primary Examiner*—J D Miller
*Assistant Examiner*—Patrick R. Salce
*Attorney, Agent, or Firm*—Allen A. Dicke, Jr.; William H. MacAllister

[57] ABSTRACT

Cross-field switch tube has three electrodes to define two concentric annular inter-electrode spaces. A magnet produces a field in both spaces, which field extends out of the switch tube through the electrodes. Circuit connects electrodes so that, with one circuit polarity, the electrode on the outside of one gap is a cathode while, with the other polarity, the electrode on the outside of the other gap is cathode for off-switching a load at any point of the AC cycle.

10 Claims, 4 Drawing Figures

Fig. 1
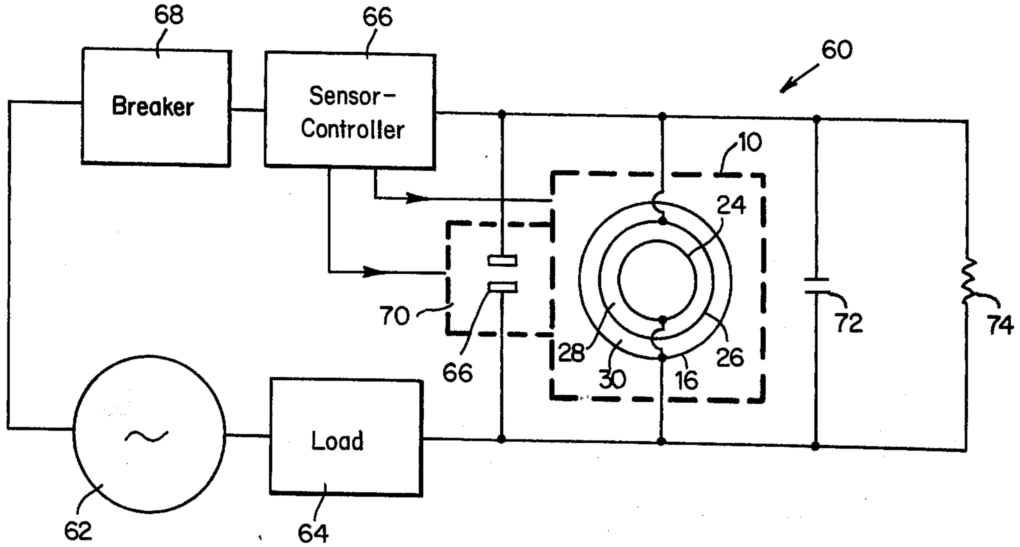
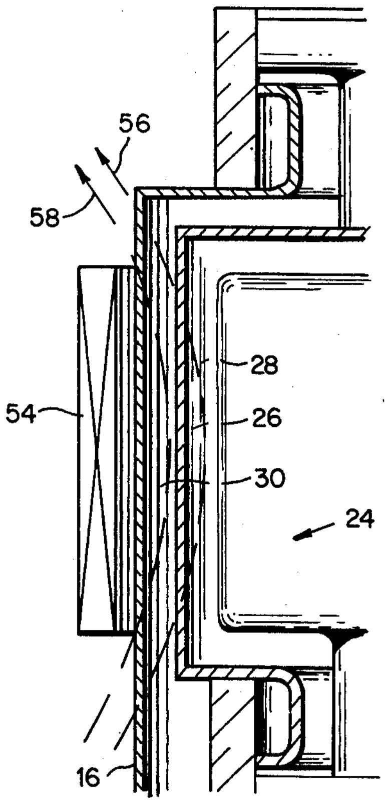
Fig. 2

BIPOLAR CROSSED-FIELD SWITCH TUBE AND CIRCUIT

CROSS REFERENCE

This application is a continuation-in-part of patent application Ser. No. 507,094 filed Sept. 18, 1974 entitled "BIPOLAR CROSSED-FIELD SWITCH TUBE AND CIRCUIT".

BACKGROUND OF THE INVENTION

This invention is directed to a bipolar crossed-field switch tube and circuit for particular use in circuits where conduction in either direction is desired.

Bipolar conduction capability in a crossed-field switch tube and offswitching in either conduction direction is essential for all AC applications of the switch tube. Furthermore, it is desirable also for DC breaker applications since, in multi-terminal transmission systems, reversal of power flow is achieved most conveniently by reversal of the current flow direction.

Crossed magnetic and electric field devices are known in the prior art. Perhaps the first disclosure of a crossed-field device for switching is Penning Pat. No. 2,182,736. Boucher Pat. Nos. 3,215,893 and 3,215,939 are primarily directed to crossed-field rectifier type switching and are directed to an improvement where the shape of the magnetic field is asserted to improve rectifying action by providing a lower breakdown voltage in one direction than the other between the two electrodes which define the gas-filled space.

M. A. Lutz and R. C. Knechtli Pat. No. 3,838,061 is one of a series of patents which indicates modern developments for higher voltage off switching and higher current capability. Other patents of this nature include G. A. G. Hofmann Pat. No. 3,604,977 and G. A. G. Hofmann and R. C. Knechtli Pat. No. 3,558,960. There are also other patents directed to improvements in the crossed-field switching device.

One particular patent which is pertinent background for the present invention is G. A. G. Hofmann and R. E. Lund Pat. No. 3,641,384 which described a crossed-field switching device which has three spaced electrodes and two gas-filled annular spaces therebetween. That patent represents a structure which was for the purpose of higher voltage hold-off in series connection and higher current capacity in parallel connection in DC applications. In other words, it was intended that both gaps would be conducting and off-switching at the same time.

SUMMARY OF THE INVENTION

In order to aid in the understanding of this invention, it can be stated in essentially summary form that it is directed to a bipolar crossed-field switch which has three concentric electrodes and two concentric annular inter electrodes spaces, and means for producing a magnetic field which extends generally axially through the inter electrode spaces but passes out of the inter electrode spaces through the electrodes thereof. By such a structure, bipolar conduction with minimum voltage drop is achieved.

It is thus an object of this invention to provide a bipolar crossed-field switch tube which is particularly arranged to conduct in either direction. It is a further object to provide a crossed-field tube which is connectable into a circuit of such nature that conduction in either direction can be required by the circuit and can be achieved by the switch tube together with off-switching of such conduction. It is another object to provide a crossed-field switch tube with two concentric inter electrode spaces and having a shaped magnetic field which passes out through the outer electrodes which define these spaces. It is yet another object to provide a bipolar structure in a single envelope for economy of space, manufacture and maintenance.

Other objects and advantages of this invention will become apparent from a study of the following portion of this specification, the claims, and the attached drawings.

BRIEF DESCRIPTION OF THE DRAWINGS

FIG. 1 is a schematic circuit employing the bipolar crossed-field switch tube of this invention.

FIG. 2 is a longitudinal section through a schematic switch tube showing the magnetic field lines.

DESCRIPTION OF THE PREFERRED EMBODIMENTS

Figure 3:
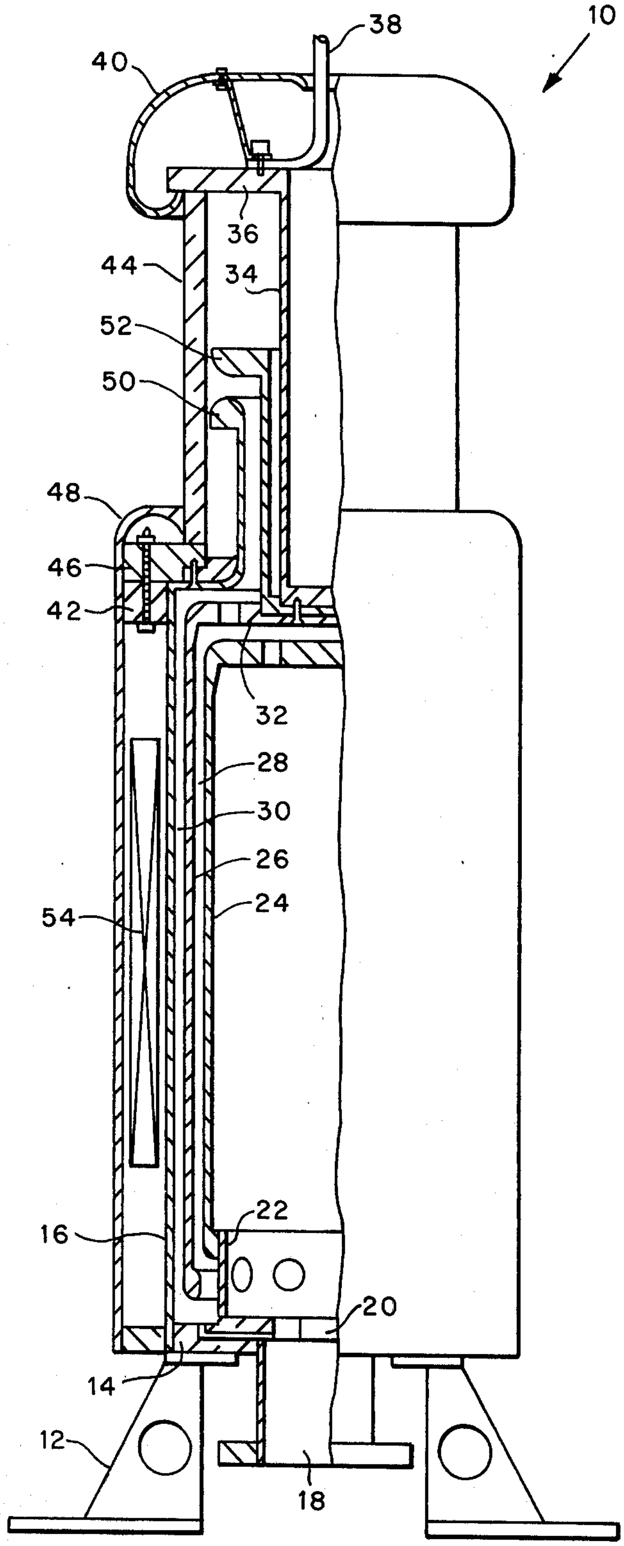
FIG. 3 is a side-elevational view of a bipolar crossed-field switch tube in accordance with this invention, with parts broken away to show a portion of the switch tube in axial section.

First considering the physical construction of the switch tube, switch tube 10 is illustrated partly in side elevation and partly in longitudinal section in FIG. 3. Supporting feet 12 support bottom disc 14 on which is mounted outer electrode 16 which also forms the vacuum-tight outer shell of the structure. Bottom disc 14 includes pump-out connection 18 by which the reduced internal pressure and internal gas composition is maintained. Disc 20 rests on top of disc 14 and carries collar 22. Inner electrode 24 is mounted on the collar. Openings in disc 20 and collar 22 provide acess from the interior of the structure to pump-out connection 18. Bottom disc 14, disc 20 and collar 22 are all metal and are secured together so that outer electrode 16 and inner electrode 24 are electrically connected. The use of a separate disc 20 in bottom disc 14 is for the purposes of manufacturing and assembly for the mounting of inner electrode 24.

Intermediate electrode 26 is mounted between the inner and outer electrodes. All of the electrodes are cylindrical in form and thus define annular interelectrode spaces 28 and 30. Intermediate electrode 26 is mounted on support disc 32 which is supported from coverplate 36. Lead 38 is secured to coverplate 36 and extends out through corona shield 40. Plate 36 is at the potential of intermediate electrode 26, and this potential is separated from the potential of flange 42 which is secured on the top end of outer electrode 16 by means of insulator 44. Insulator 44 is tubular and has flange 46 secured at its lower end. By separation of flanges 42 and 46, the upper structure can be moved, withdrawing intermediate electrode 26. Thereupon, disc 20 can be unfastened from disc 14 so that the inner-electrode 24 and its supporting structure can be removed upward through the opening in flange 42. Corona shield 48 surrounds the flanges and the structure at the potential of the base. Shields 50 and 52 are positioned within the tubular interior of insulator 44 to control the electric field therein. As is well known from Paschen breakdown, it is necessary to limit the length of the electron paths in order to prevent breakdown under the wrong circumstances.

Switch tube 10 is a crossed-field switch. When potential is applied, the potential is radial across the inter-electrode space. The other field is a magnetic field provided by magnet 54. Magnet 54 can either be a permanent magnet and electromagnet combination or an electromagnet only. During conducting, both electric and magnetic fields are on; however, to provide off-switching, the magnetic field must be turned off. Off-switching of a permanent magnet can be accomplished by a bucking electromagnet. Off-switching of an electromagnet can be accomplished by off-switching of the main magnet coil, bucking or both. (See Wasa Pat. No. 3,405,300.)

The prior art crossed-field tubes employed the outer electrode as a cathode, because the glow discharge is cathode area-limited rather than anode area-limited. With the outer electrode of larger area, this was the natural connection polarity. The devices could be operated in either direction, but the voltage drop with the electrode on the inside of the gap serving as cathode was greater than when the outside electrode was connected as cathode. This was orginally thought to be a function of the cathode area-limiting factor as discussed above, but it has now been discovered that the difference in voltage drop in the two directions is a function of the magnetic field shape. When the field is shaped perfectly axially along the annular inter-electrode gap, then the voltage drop is equal for conduction in each direction until current density reaches cathode area limits. Furthermore it was discovered that when, the magnet was positioned to provide magnetic field lines such as are shown at 56 and 58 in FIGS. 2, and 4 the voltage drop is lower when the outside electrode is connected as cathode. Thus, when the magnetic field lines enter and exit out through the electrode which serves as a cathode, electron confinement along the axial length of the gap is achieved. With this confinement, a reduced voltage drop is achieved when the cathode is toward the concave side of the curve-shaped magnetic field.

With the outer electrode serving as the cathode, and for cathode current densities up to 10 A per square centimeter, the voltage drop across the gap is in the range of 300–500 volts. If the polarity is reversed and the inner electrode (using the same inter-electrode gap) serves as the cathode, the voltage drop is in the range of 1000–2000 volts, for these same current densities up to 10A per square centimeter.

Figure 4:
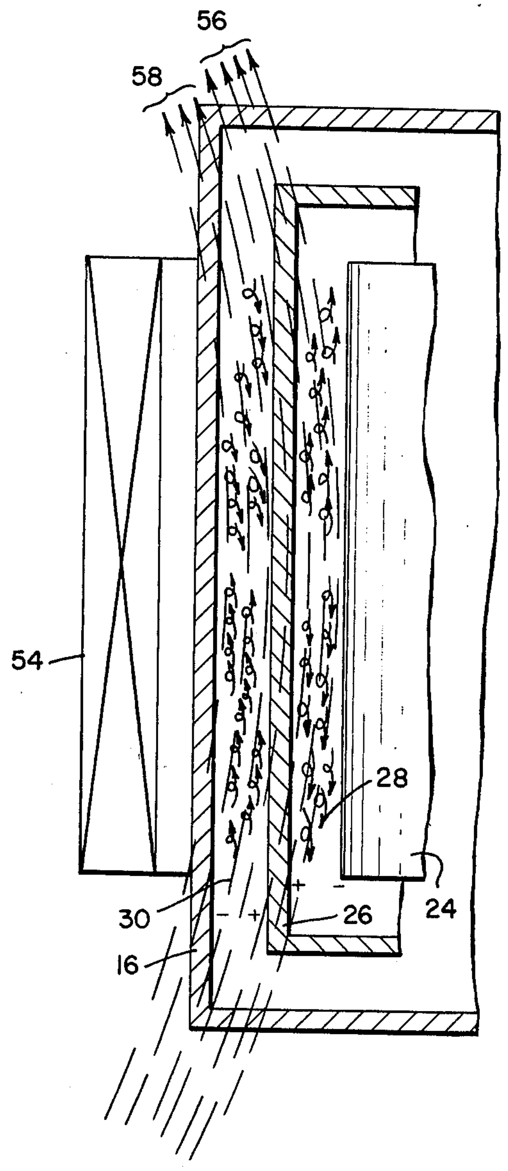
FIG. 4 is a view similar to FIG. 2 and showing the electrodes and gaps on a larger scale and showing the magnetic field lines and electrodes therein.

The improved electron trapping which is synonymous with more efficient plasma generation is illustrated in FIG. 4 for the case of the outer electrode serving as the cathode.

Electron motion in cross-field tubes is complex because the electrons move radially from cathode to anode due to the electric field, and move around the circumference due to the magnetic field and also there is electron drift or spiral along magnetic field lines 56 and 58. When an electron is emitted from outer electrode 16, with the magnetic field curvature shown in FIG. 4, the electrons drift axially toward the center of the active plasma region, spirally around the magnetic field lines 58. This causes motion away from the axial ends of the gap 30 to cause electron concentration trapping.

When an electron is emitted from inner electrode 24 (as would be the case for a single gap tube with reversed polarity) the electron drift would be axially outward of the gap 28 along a spiral path around the magnetic field lines 56 to reduce concentration. The electrons drift out of the active plasma region. In this latter case, it is clear that the electrons do not remain in the active region as long as in the former case. The result is a less efficient plasma generation which results in a higher voltage drop across the tube.

Under these voltage drop situations, when the polarity reverses as in the AC circuit of FIG. 1, the intermediate electrode 26 alternately acts as an anode and a cathode. As polarity changes, the discharge shifts from one gap to the other so that the outer electrode in each gap alternately serves as cathode.

FIG. 1 is a schematic AC current limiter circuit, generally indicated at 60. AC power source 62 supplies current to load 64. Serially connected between the AC current source and the load is AC current limiter 60, and sensor-controller 66 for sensing system characteristics such as voltage and current and rate of change thereof. Circuit breaker 68 is also connected into the series circuit and is a conventional station breaker for opening under non-fault conditions and for opening at the next current zero while the current limiter circuit limits current from the time of the fault to the next current zero. Circuit breaker 68 conventionally has its own sensor.

Serially connected into the system as part of the AC current limiter circuit is mechanical switch 70. Mechanical switch 70 can be switch of the the type shown in N. E. Reed patent No. 3,750,061 or as shown in W. Knauer and W. L. Dugan patent 3,912,975.

Mechanical switch 70 is normally closed so that current normally flows therethrough. When a fault occurs and current rises, current limiter circuit 60 is operated to hold the current down to tolerable levels until the fault is cleared or the circuit is opened by normal circuit breakers. When a fault is sensed, switch 70 is opened and switch tube 10 conducts in the gap where the polarity at that time has the outer electrode acting as cathode. The gaps 28 and 30 are alternately conducting, if required, so that the AC current is conducted until switch 70 is opened and deionized. Thereupon, the magnetic field is switched off of switch tube 10 so that it becomes non-conductive. This switches surge-limiting capacitor 72 and current-limiting impedance 74 into the circuit to hold down the circuit current to tolerable levels, preferably substantially to full load levels. Current is thus limited until the fault is cleared or the main circuit breakers open the line. Automatic selection between the conducting gaps 28 and 30 by the AC current flow is achieved because the voltage drop in one is greater than the voltage drop in the other during conduction, due to the shaped magnetic field, to provide automatic selection.

Sensing is necessarily rapid, because it is intended that the current limiter be switched into current limiting service during the same cycle that a fault is sensed. One suitable sensor concept is shown in W. Knauer patent No. 3,912,975. A further implementation of the sensing device is shown in A. F. Dickerson patent (S/N 555770, filed Mar. 6, 1975). These fast acting sensors are equipped to control the in-line switch 70 and the bipolar crossed-field switch 10 to achieve the current limiting cycle described. Furthermore, the sensor-controller 66 is preferably connected to breaker 68 for off-switching thereof as part of the current limiting cycle.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A bipolar crossed-field switch tube for installation in an electric power system where voltage of either polarity may be applied to the switch tube comprising:

an outer tubular electrode to act as cathode during one polarity of the power system;

an intermediate tubular electrode positioned within said outer tubular electrode to act as cathode during the other polarity of the power system and to define an outer annular inter-electrode space;

an inner electrode positioned within said intermediate electrode to define an inner annular inter-electrode space;

means for selectively providing a concave outward shaped magnetic field in both of said inter-electrode spaces; and means for connecting said inner and said outer electrodes together into one power system pole and means for connecting said intermediate electrode to the other power system pole so that one of said connected together electrodes acts as a cathode during one polarity of the power system and said intermediate electrode acts as a cathode during the other polarity of the power system said magnetic field means providing a field which is concave toward both of said electrodes acting as a cathode for trapping of electrons in glow discharge, and said switch tube being nonconductive in the absence of the magnetic field.

2. The switch tube of claim 1 wherein said outer electrode forms a portion of an outer shell which serves as an envelope for the maintenance of reduced pressure within said inner-electrode spaces.

3. The switch tube of claim 2 wherein an insulator tube is detachably secured adjacent one end of said outer electrode, said intermediate electrode being secured to said insulator tube.

4. The switch tube of claim 3 wherein said inner electrode is demountably attached to said outer electrode at its end opposite the attachment of said insulator tube.

5. The switch tube of claim 1 wherein said means for producing a magnetic field is an electromagnet positioned exteriorly of said outer electrode.

6. The switch tube of claim 5 wherein said switch tube is connected to an AC power system and said outer electrode serves as cathode during one half cycle and said intermediate electrode serves as cathode during the other half of the AC cycle and said electromagnet forms a magnetic field which is concave outwardly so that it passes through both said intermediate and said outer electrode.

7. The switch tube of claim 1 wherein the power system is an AC power system and the switch tube is connected to the poles of said AC power system.

8. A current limiter circuit in an alternating current power system comprising a source of alternating current and a load serially connected therewith, said current limiting circuit also being serially connected therewith and comprising:

an in-line switch device for carrying normal load current;

a bipolar three electrode and two gap crossed field switch connected in parallel to said in-line switch for conducting in one gap when voltage is applied during one half of the AC cycle and in the other gap when voltage is applied during the other half of the AC cycle during opening and deionizing of said in-line switch and for becoming nonconductive thereafter to increase circuit impedance; and a resistor connected in parallel to said bipolar crossed field switch for carrying circuit current when said switch device and said crossed switch field are nonconductive.

9. The circuit of claim 8 further including a sensor connected to measure load current and connected to said switch device and said crossed field switch for causing them to actuate upon sensing a system load condition where current limiting is required.

10. The circuit of claim 8 wherein said bipolar crossed-field switch tube comprises:

an outer tubular electrode;

an intermediate tubular electrode positioned within said outer tubular electrode to define an outer annular interelectrode space;

an inner electrode positioned within said intermediate electrode to define an inner annular interelectrode space;

means for selectively providing a magnetic field in both of said interelectrode spaces; and means for connecting said inner and said outer electrodes together to one connection point and means for connecting said intermediate electrode to another connection point, one of said connection points connected to said load and the other of said connection points connected to said AC power source so that one of said connected together electrodes act as a cathode during one-half of the AC cycle and said intermediate electrode acts as a cathode during the other half of the AC cycle, said magnetic field means providing a field which is concave towards both of said electrodes acting as a cathode for the trapping of electrons in glow discharge, and said switch to be nonconductive in the absence of the magnetic field.

* * * * *